United States Patent [19]

Watkins

[11] 3,965,306
[45] June 22, 1976

[54] TELEPHONE LINE TRANSFER CIRCUIT

[75] Inventor: Arthur Gene Watkins, Santa Ana, Calif.

[73] Assignee: San/Bar Corporation, Santa Ana, Calif.

[22] Filed: Nov. 11, 1974

[21] Appl. No.: 522,866

[52] U.S. Cl............................ 179/81 R; 179/18 BE
[51] Int. Cl.².......................................... H04M 3/54
[58] Field of Search.......... 179/18 BD, 18 B, 18 BE, 179/81 R, 84 A, 84 R

[56] References Cited
UNITED STATES PATENTS

| | | | |
|---|---|---|---|
| 3,041,405 | 6/1962 | Lomax............................ | 179/18 BE |
| 3,704,346 | 11/1972 | Smith et al...................... | 179/18 BE |
| 3,825,699 | 7/1974 | Danner............................ | 179/81 R |
| 3,858,008 | 12/1974 | Remec............................. | 179/18 AB |

FOREIGN PATENTS OR APPLICATIONS

| | | | |
|---|---|---|---|
| 21,445 | 9/1969 | Japan.............................. | 179/18 BD |
| 615,503 | 1/1949 | United Kingdom............. | 179/18 BD |

*Primary Examiner*—Thomas W. Brown
*Attorney, Agent, or Firm*—Jackson & Jones Law Corporation

[57] ABSTRACT

Transfer of an incoming call on a first telephone line for a first subscriber set to a second, independent telephone line for a second subscriber set is accomplished without permitting a party at the first subscriber set to listen to the transferred call. An adjustable time delay circuit causes the tip and ring leads of the first central office telephone line to be switched to the second subscriber set, after a predetermined amount of ringing at the first subscriber set. If the second subscriber set is in use or is being rung at the time a transfer is to take place, no switching occurs. If the first subscriber set is answered before the preset time delay is elapsed, no switching occurs. The line transfer circuit may operate from either a −24 or −48 volt DC supply. Upon transfer of the first pair of tip and ring central office lines to the second subscriber set, the second pair of tip and ring central office lines are isolated and terminated with a capacitor suitably chosen to represent a high impedance ringer.

10 Claims, 2 Drawing Figures

TELEPHONE LINE TRANSFER CIRCUIT

BACKGROUND OF THE INVENTION

The present invention generally relates to improvements in call transfer circuits and more particularly pertains to a line transfer circuit wherein a first subscriber line from a central office is switched to a second subscriber set after a predetermined time delay during ringing of the first subscriber set.

In the field of telephone call transferring circuits, it has been the practice to forward ringing current to another subscriber set after a predetermined time delay or immediately upon assignment. Although such devices work satisfactorily in transferring the ringing current to a second or designated subscriber set, generally, a complex and expensive system is required to carry out such a function and common loop circuits for the transferring and receiving subscriber sets are used. This arrangement does not provide for call transferring between two independent lines and allows the transferring subscriber set to listen in on a conversation that has been directed to a receiving subscriber set.

OBJECTS AND SUMMARY OF THE INVENTION

An object of this invention is to provide a call transfer circuit that provides for call transferring between two independent telephone lines.

Another object of this invention is to provide a call transfer circuit that provides for privacy between the subscriber sets when a call transfer occurs and that does not interfere with the normal independent operation of the subscriber sets prior to a transfer.

These objects and the general purpose of this invention are accomplished in the following manner. Ringing and loop current detectors are provided on a first pair of tip and ring leads, for a first subscriber set, and a second pair of tip and ring leads for a second subscriber set. An adjustable time delay circuit is actuated in response to ringing current on the first pair of tip and ring leads. If the first subscriber set is not answered within the time period of the time delay circuit, the first pair of tip and ring leads is connected to the second subscriber set. This transfer is not allowed if the second subscriber set is found either to be busy or is also being rung at this time. After transfer of the first set of tip and ring leads to the second subscriber set, the first subscriber set is isolated and the second set of tip and ring leads are isolated and terminated with a high impedance ringer element.

BRIEF DESCRIPTION OF THE DRAWINGS

Other objects and many of the attendant advantages of this invention will be readily appreciated as the invention becomes better understood by reference to the following detailed description when considered in conjunction with the accompanying drawings in which like reference numerals designate like parts throughout the figures thereof and wherein.

DESCRIPTION OF THE PREFERRED EMBODIMENTS

Figure 1:
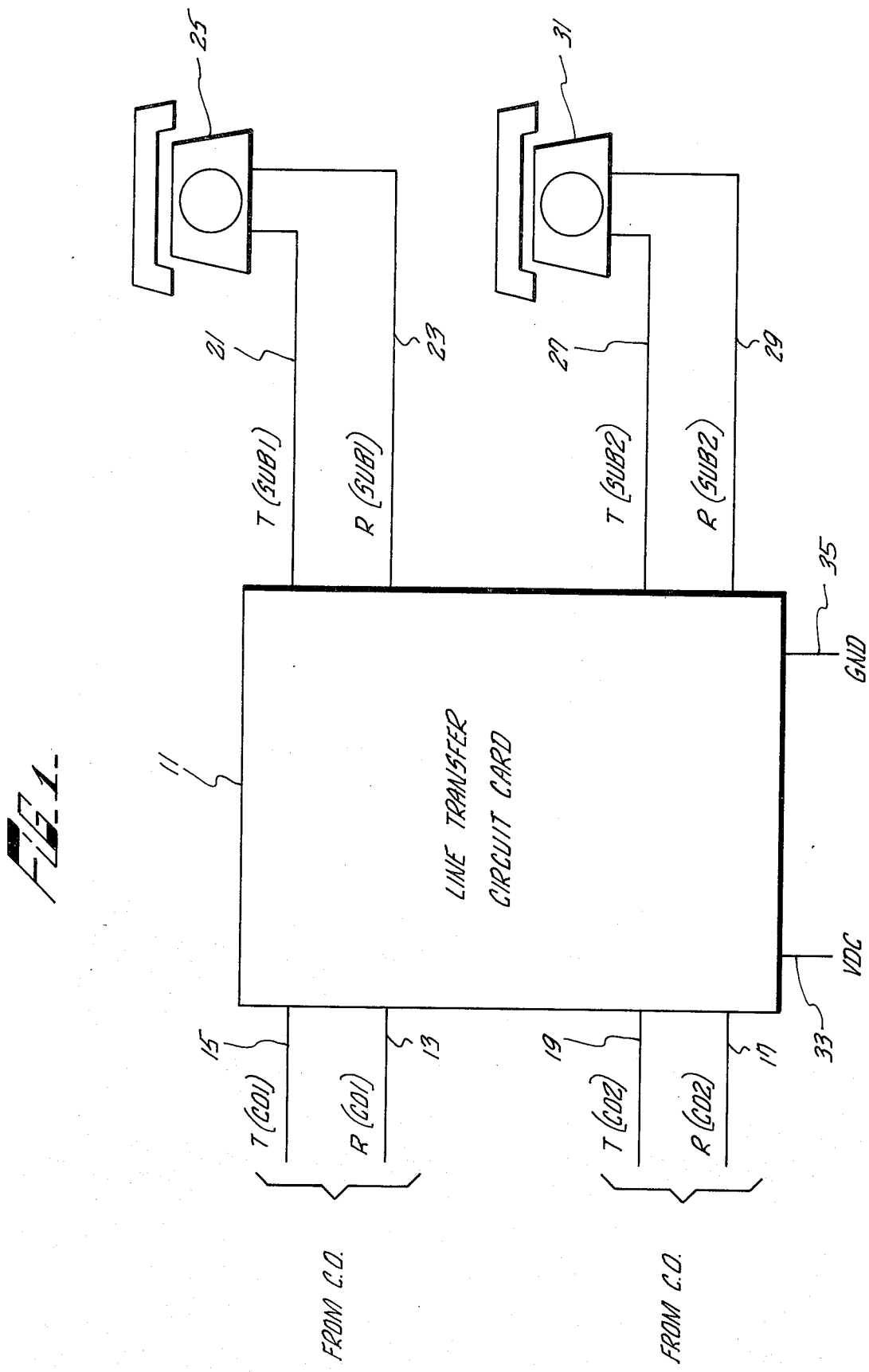
FIG. 1 is a block diagram illustration of how the line transfer circuit of this invention is connected into the tip and ring circuits for a pair of subscriber sets.

Referring first to FIG. 1, the line transfer circuit 11 of this invention is shown as being connected between two central office tip-ring pairs and a pair of subscriber sets. A first pair of tip and ring lines from the central office is dedicated to a first subscriber set. This first set of tip and ring lines 15 and 13, respectively connect to the line transfer circuit card 11. The first subscriber set 25 has its tip and ring terminals 21, 23 respectively, connected to the line transfer circuit 11. A second set of tip and ring lines 19, 17 from the central office, which are independent of tip and ring lines 15, 13, also connect to the line transfer circuit 11. A second subscriber set has its tip and ring terminals 27, 29 connected to the line transfer circuit 11. The line transfer circuit 11 is supplied with a negative DC voltage at terminal 33 and a ground connection at terminal 35.

The operation of the line transfer circuit will be more fully explained hereinafter as being capable of operating from a −24 or a −48 volt DC source. The line transfer circuit 11 may be packaged on a circuit card that could be mounted in a rack with other like circuit cards at a central office location or at a subscriber location.

Figure 2:
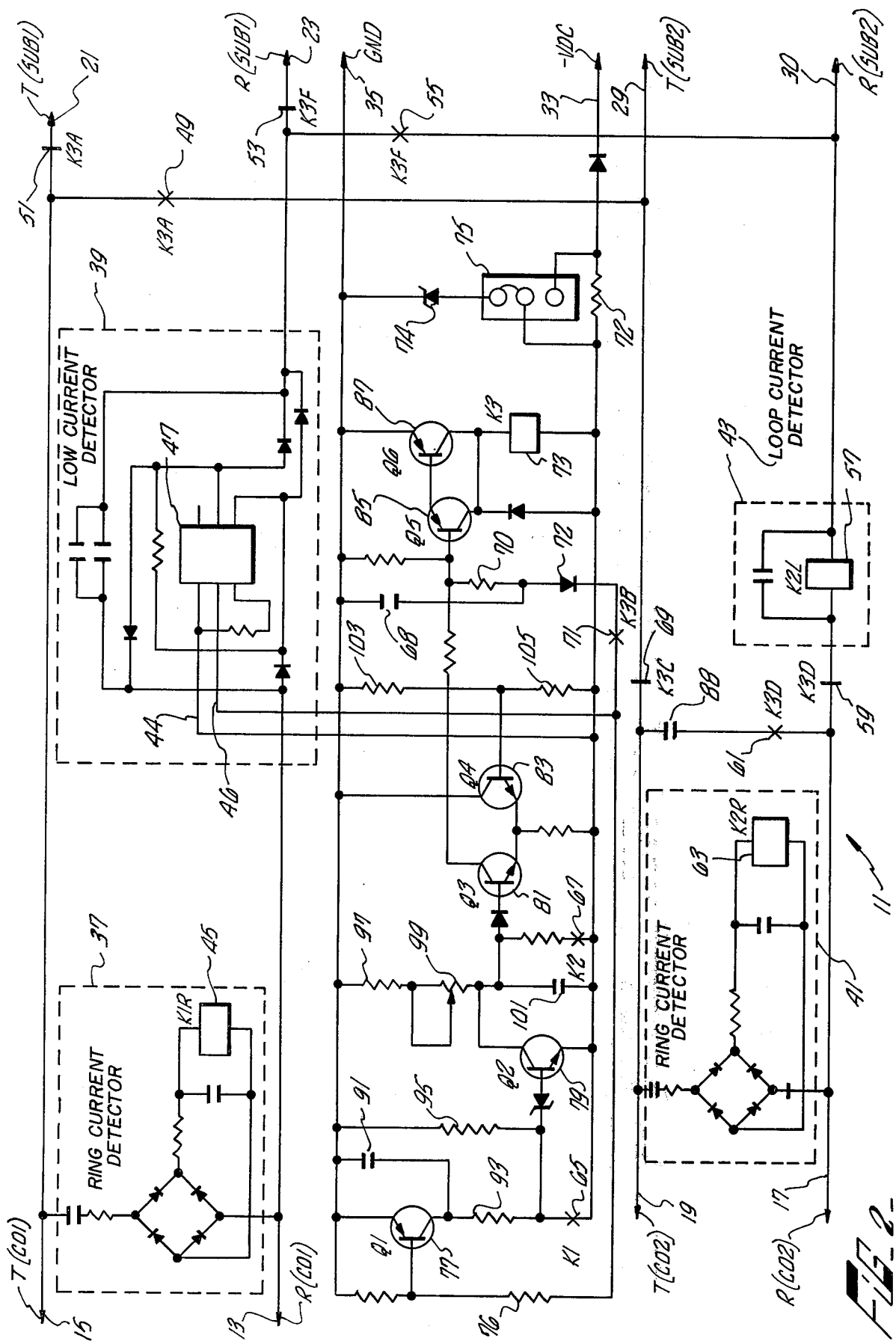
FIG. 2 is a circuit diagram illustrating a preferred embodiment of the line transfer circuit of this invention.

The circuitry of the line transfer circuit 11 is illustrated in FIG. 2. A tip line 15 from a central office, for a first subscriber set is connected to the tip terminal T(C01) of the line transfer circuit 11. A ring line 13 from the same central office, for the first subscriber set is connected to the ring terminal R(C01) of the subscriber circuit. A second tip line 19, from a central office, for the second subscriber set is connected to the tip terminal T(C02) of the line transfer circuit 11. A second ring line 17 from the same central office is connected to the ring terminal R(C02) of the line transfer circuit. A ground is connected to terminal 35 of the line transfer circuit. A minus DC voltage is supplied to the line transfer circuit over line 33. This DC voltage may be either −24 to −48 volts. The positive side of this voltage source is connected to ground. A first subscriber set has its tip and ring terminals connected to lines 21 and 23 respectively. A second subscriber set has its tip and ring terminals connected to lines 29 and 30 respectively.

A ring current detector circuit 37 is connected across tip and ring lines 15, 13. A loop current detector circuit 39 is connected in series with ring line 13. A second ring current detector 41 is connected across the tip and ring lines 19, 17 for the second subscriber set. A second loop current detector circuit 43 is connected in series with the ring line 17. A plurality of transistor switches 77, 79, 81, 83, 85 and 87 respond to the ring current and loop current detectors of the line transfer circuit 11 to turn the K3 relay 73 either on or off.

In its off state, K3 relay 73 has a plurality of normally closed contacts 51, 53, 69, 59 and a plurality of normally open contacts 49, 55, 71 and 61. Upon being switched to an on state, K3 relay 73 causes the normally open contacts to close and the normally closed contacts to open.

A series resistance-capacitance leg consisting of resistors 97, 99 and capacitor 101 has a variable resistor 99 therein which provides for manually adjusting the time delay between detection of the first ringing current by ringing detector 37 and the activation of K3 relay 73.

With the line transfer circuit of FIG. 2 connected to a pair of central office tip and ring lines 15, 13 and 19, 17 and to a pair of subscriber sets, as shown, the central office tip and ring lines 15, 13 for the first subscriber set will be connected to the second subscriber set by way of normally open contacts 49 and 55, whenever the first subscriber set is not answered within the time period determined by the R-C timing circuit made up of resistors 97, 99 and capacitor 101. If the first subscriber set is answered within the time period, no transfer occurs. If the first subscriber set is not answered within that time period, the transfer will still not occur if the second subscriber set is busy, either because of ringing current in its tip and ring circuit, or because of loop current in its tip and ring circuit. Once tip and ring lines 15, 13 from the central office have been connected to the second subscriber set lines 29 and 30, the first subscriber set connected to lines 21 and 23 is isolated from the loop circuit by a pair of open contacts 51 and 53. This isolation prevents a party at the first subscriber set from listening in on a transferred call.

The line transfer circuit of FIG. 2 performs the above described functions in the following manner. Prior to any loop or ring current being present in either the tip and ring circuit of the first subscriber or the tip and ring circuit of the second subscriber, transistor 77 is not conducting, effectively acting like an open circuit. There is no voltage build up on capacitor 91, however, because contacts 65, activated by K1 relay 45, are open at this time. Transistor 79 is conducting, thereby preventing a voltage build up on capacitor 101. Any charge present on capacitor 101 is insufficient to turn on transistor 81 which is, therefore, nonconducting. Transistor 83 is turned on and conducting by way of resistors 103 and 105, thereby preventing transistor 81 from turning on. With transistor 81 in the off condition, transistor 85 is held nonconducting which in turn holds transistor 87 in an off state. K3 relay 73, therefore, is in its unactivated state causing its contacts to be in their normal or rest positions. Thus, the first pair of tip and ring lines 15, 13 coming from the central office are connected directly to the tip and ring terminals of the first subscriber set and the second pair of tip and ring lines 19, 17 from the central office are connected directly to the tip and ring terminals of the second subscriber set. No interaction occurs between the two subscriber lines.

Assume now that ringing current is sent over the first pair of tip and ring lines 13, 15 to the first subscriber set. Ringing current, as is well known, consists of an alternating current that is on for two seconds and off for four seconds. Ring current detector 37, while ringing current is present in the tip and ring loop 13, 15, will cause K1 relay 45 to operate, which causes closure of contact 65. When contact 65 closes, the emitter and base of transistor switch 79 are placed at the same negative potential, thereby turning transistor 79 off. The closure of contact 65 also causes capacitor 91 to accumulate a charge thereon that places a negative potential on the base of transistor 79. During the four second absence of ringing current, K1 relay 45 is again released thereby opening contact 65. However, the negative charge now present on capacitor 91 holds transistor 79 off for that four second interval and is again charged when K1 relay 45 is again enabled by a second burst of ringing current.

While transistor 79 is off, capacitor 101 will begin building up a voltage charge thereon at a rate depending on the value of the resistors 97, 99. Capacitor 101 will continue building its voltage charge until either the first subscriber set is answered or switching action occurs. If the first subscriber set is answered before switching occurs, a loop current is introduced into the tip and ring loop circuit for the first subscriber set. This loop current is detected by the loop current detector 39 in this circuit. The loop current detector 39 contains an integrated circuit chip 47 which is readily available. The integrated circuit chip has a photo-transistor therein connected across leads 44 and 46. A light-emitting diode therein is connected across terminals 1 and 2. Upon loop current flowing through the light-emitting diode, the light emitted therefrom causes the photo-transistor to switch on thereby connecting the minus DC voltage from line 33 to the base of transistor 77 by way of resistor 76. This will cause transistor 77 to turn on and discharge the capacitor 91, in turn, turning transistor 79 on, causing capacitor 101 to discharge.

Assume now that the first subscriber set is not answered and that the voltage charge across capacitor 101 develops to a point where it exceeds the voltage drop across resistor 105 at the base of transistor 83. When that occurs, transistor 83 turns off and transistor 81 turns on causing transistors 85 and 87 to turn on. Upon current flowing through transistors 87, K3 relay 73 is activated causing normally open contacts 49 and 55 to close and connect subscriber set tip and ring lines 29, 30 to central office tip and ring lines 13, 15. In addition, normally closed contacts 51 and 53 open, isolating the first subscriber set tip and ring lines 21, 23 from the talking loop. Other normally open contacts of K3 relay 73 such as, contacts 71 and 61 also close while normally closed contacts 69 and 59 open.

Closing contacts 61 causes a capacitor 88 to be placed across the tip and ring lines 17, 19 from the central office. Capacitor 88 has an impedance representative of a high impedance ringer. The opening of normally closed contacts 69 and 59 disconnects the second subscriber set on the tip and ring lines 29, 30 from the central office tip and ring lines 19, 17. Upon contacts 49 and 55 closing, ringing current is transferred to the tip and ring lines 29, 30 of the second subscriber set, causing ringing to occur in the second subscriber set.

Upon the second subscriber set answering, a loop current is detected in the tip and ring lines 13, 15, by loop current detector 39. The integrated circuit chip 47 with the photo-transistor therein will cause lines 44 and 46 to be effectively shorted, thereby again causing transistor 77 to turn on and discharge capacitor 91. This turns on transistor 79 causing capacitor 101 to discharge. With capacitor 101 discharged, transistor 81 turns off and transistor 83 turns on. With transistor 81 off, transistor 85 would turn off, were it not for the negative DC voltage coming in on line 33 being connected to the anode of diode 72 through the now closed contact 71. This causes the voltage drop across resistor 70 to maintain transistors 85 and 87 conducting, thereby maintaining K3 relay 73 activated. This condition will exist as long as there is a loop current in the loop consisting of tip and ring lines 15, 13, 29 and 30.

Upon the second subscriber set terminating the conversation, the loop current detector 39 will cause lines 44 and 46 to again be open circuited, thereby removing the negative DC voltage from the anode of diode 72 causing the transistor 85 to turn off after a short time delay determined by the R-C time constant of capacitor 68 and resistor 70. Upon transistor 85 turning off, transistor 87 turns off, causing K3 relay 73 to be disabled, thereby again opening the contacts 49 and 55, closing contacts 51 and 53, opening contacts 79 and 61 and closing contacts 69 and 59.

Assume now that ringing current is being received on the first pair of tip and ring lines 15, 13 from the central office for the first subscriber set at the same time that ringing current is being received on the second pair of tip and ring lines 19, 17 from the central office for the second subscriber set. Ringing current detector 41 detects this ringing current and causes K2 relay 63 to activate in response thereto causing normally open contact 67 to close, thereby discharging capacitor 101 for the period that the ring current is present in the loop. This action prevents the charge on capacitor 101 from building up to a value that will turn transistor 81 on. Therefore, it can be seen that if the first subscriber set is not answered within the time period established by the variable resistor 99 a transfer will not occur because the periodically closed contacts 67 driven by K2 relay 63 will prevent the charge on capacitor 101 from building up to a level which will turn transistor 81 on. Without transistor 81 conducting, transistor 85 remains nonconducting, thereby causing K3 relay 73 to remain unactivated.

Assume now that while ringing current is being received in the first pair of tip and ring lines 15, 13 from the central office for the first subscriber set, the second pair of tip and ring lines 19, 17 are carrying loop current because the second subscriber set of off-hook. With loop current flowing in the second tip and ring loop, loop current detector 43 causes K2 relay 57 to activate, which causes normally open contacts 67 to close. As mentioned above, for the detection of ring current by ring current detector 41, the closure of this contact causes capacitor 101 to discharge to the point where transistor 81 cannot turn on. Thus, it can be seen that even though the first subscriber set is not answered within the time period determined by the variable resistor 99, when the second subscriber set is busy, as indicated by loop current in its tip and ring lines, a transfer cannot occur.

A strappable option connection 75 facilitates the line transfer circuit 11, operating with a −48 or a −24 volts DC. If a −24 volts is connected to line 33, the strappable option device 75 is adjusted so that resistor 72 is bypassed, thereby providing −24 volts across lines 35 and 33. If a −48 volts is connected to line 33, the strappable option device 75 is adjusted so that the resistor 72 is in the circuit and dropping 24 volts thereacross. The zener diode 74 in this instance provides a constant −24 volts across lines 33 and 35.

In summary, what has been described is a call transfer circuit that provides for privacy between the subscriber sets. The call transfer circuit of the invention is inexpensive and does not interfere with the normal independent operation of the subscriber sets prior to a transfer occurring. It should be understood, of course, that the foregoing disclosure relates only to a preferred embodiment of the invention and that numerous modifications may be made therein without departing from the spirit and the scope of the invention as set forth in the appended claims.

What is claimed is:

1. A telephone line transfer circuit for transferring a first pair of tip and ring lines, connected between a central office and a first subscriber set, to a second subscriber set, connected to a second pair of tip and ring lines from a central office, said line transfer circuit comprising:
   first ring current detector means for detecting ringing current in said first pair of tip and ring lines;
   second ring current detector means for detecting ringing current in said second pair of tip and ring lines;
   loop current detector means for detecting loop current in said second pair of tip and ring lines;
   means responsive to said first ring current detector means for, after a predetermined time delay, connecting said first pair of tip and ring lines to said second subscriber set and disconnecting said first subscriber set from said first pair of tip and ring lines; and
   means responsive to said second ring current detector means or said loop current detector means for preventing said connecting means from operating.

2. The telephone line transfer circuit of claim 1 wherein said connecting means includes: means for manually adjusting the predetermined time delay.

3. The telephone line transfer circuit of claim 1 further comprising:
   means responsive to said connecting means for disconnecting said second subscriber set from said second pair of tip and ring lines and connecting an impedance representative of a high impedance ringer across said second pair of tip and ring lines.

4. The telephone line transfer circuit of claim 1 wherein said preventing means disables said connecting means prior to its operation and has no effect on said connecting means after its operation.

5. The telephone line transfer circuit of claim 1 further comprising: means responsive to said second subscriber set terminating a conversation for reconnecting said first pair of tip and ring lines to said first subscriber set, and reconnecting said second pair of tip and ring lines to said second subscriber set.

6. A line transfer circuit for transferring a first pair of tip and ring lines, connected to a first subscriber set, to a second subscriber set, connected to a second pair of tip and ring lines, said line transfer circuit comprising:
   first ring current detector means for detecting ringing current in said first pair of tip and ring lines;
   first loop current detector means for detecting loop current in said first pair of tip and ring lines;
   second ring current detector means for detecting ringing current in said second pair of tip and ring lines;
   second loop current detector means for detecting loop current in said second pair of tip and ring lines;
   means responsive to said first ring current detector means for, after a predetermined time delay, connecting said first pair of tip and ring lines to said second subscriber set and disconnecting said first subscriber set from said first pair of tip and ring lines; and
   means responsive to said second ring current detector means or said second loop current detector means for preventing said connecting means from operating.

7. The line transfer circuit of claim 6 wherein said connecting means includes: means for manually adjusting the predetermined time delay.

8. The line transfer circuit of claim 6, further comprising:

means responsive to said connecting means for disconnecting said second subscriber set from said second pair of tip and ring lines and connecting an impedance representative of a high impedance ringer across said second pair of tip and ring lines.

9. The line transfer circuit of claim 6 further comprising:
means responsive to said first loop current detector means for preventing said connecting means from operating.

10. The line transfer circuit of claim 6 further comprising: means responsive to said second subscriber set terminating a conversation for reconnecting said first pair of tip and ring lines to said first subscriber set, and reconnecting said second pair of tip and ring lines to said second subscriber set.

* * * * *